(12) United States Patent
Webber et al.

(10) Patent No.: US 11,515,750 B2
(45) Date of Patent: Nov. 29, 2022

(54) PERMANENT MAGNET MACHINE STATOR

(71) Applicant: STEERING SOLUTIONS IP HOLDING CORPORATION, Saginaw, MI (US)

(72) Inventors: Kenneth Webber, Saginaw, MI (US); Delynn Streng, Freeland, MI (US); Iftekhar Hasan, Akron, OH (US); Yilmaz Sozer, Stow, OH (US); Alejandro J. Pina Ortega, Saginaw, MI (US); Jeffrey T. Klass, Kawkawlin, MI (US); Mohammed R. Islam, Saginaw, MI (US)

(73) Assignees: STEERING SOLUTIONS IP HOLDING CORPORATION, Saginaw, MI (US); THE UNIVERSITY OF AKRON, Akron, OH (US)

( * ) Notice: Subject to any disclaimer, the term of this patent is extended or adjusted under 35 U.S.C. 154(b) by 20 days.

(21) Appl. No.: 16/211,778

(22) Filed: Dec. 6, 2018

(65) Prior Publication Data
US 2020/0186001 A1    Jun. 11, 2020

(51) Int. Cl.
*H02K 5/24* (2006.01)
*H02K 1/14* (2006.01)
*H02K 21/16* (2006.01)

(52) U.S. Cl.
CPC .............. *H02K 5/24* (2013.01); *H02K 1/146* (2013.01); *H02K 21/16* (2013.01)

(58) Field of Classification Search
CPC ............ H02K 1/17; H02K 1/165; H02K 5/24; H02K 1/12; H02K 1/14; H02K 1/16;
(Continued)

(56) References Cited

U.S. PATENT DOCUMENTS 5,365,132 A * 11/1994 Hann ...................... H02K 1/20
174/DIG. 20
6,885,125 B2 * 4/2005 Inayama ................ H02K 29/03
310/156.53
(Continued)

FOREIGN PATENT DOCUMENTS

| CN | 104333152 A | 2/2015 |
|---|---|---|
| CN | 204156622 U | 2/2015 |

(Continued)

OTHER PUBLICATIONS

English translation of Office Action regarding corresponding DE App. No. 10 2019 132 832.2; dated Aug. 19, 2020.
(Continued)

*Primary Examiner* — Thomas Truong
(74) *Attorney, Agent, or Firm* — Dickinson Wright PLLC (57) ABSTRACT

A permanent magnet machine includes a machine housing and a stator disposed within the machine housing. The machine housing has an inner surface that extends between a first housing end and a second housing end along a central longitudinal axis. The stator has a stator core having an exterior surface and an interior surface, each extending between a first face and a second face along the central longitudinal axis. The stator core defines a plurality of openings that extend from the first face towards the second face.

7 Claims, 6 Drawing Sheets

(58) Field of Classification Search
CPC .. H02K 1/18; H02K 1/20; H02K 1/32; H02K 1/146; H02K 21/16
USPC .... 310/216.001, 216.055, 216.068–216.074, 310/51, 52, 58, 59, 89
See application file for complete search history.

(56) References Cited

U.S. PATENT DOCUMENTS

| | | | | |
|---|---|---|---|---|
| 2003/0062780 | A1* | 4/2003 | Kaneko | H02K 1/20 310/58 |
| 2004/0119367 | A1* | 6/2004 | Hiwaki | H02K 1/185 310/58 |
| 2004/0124731 | A1* | 7/2004 | Kimura | F04C 23/008 310/216.044 |

FOREIGN PATENT DOCUMENTS

| | | |
|---|---|---|
| CN | 107112817 A | 8/2017 |
| DE | 102014226593 A1 | 6/2016 |
| JP | 2007205227 A | 8/2007 |

OTHER PUBLICATIONS

English translation of Office Action regarding corresponding CN App. No. 2019112408480; dated Nov. 1, 2021.

* cited by examiner

PERMANENT MAGNET MACHINE STATOR

BACKGROUND

Electric machines are used in automotive systems, precision tooling, or industrial drives and may have specific requirements to operate with low noise and vibration. Some sources of noise, vibration, or harshness in the electric machine may be cogging torque, torque ripple, and electromagnetic radial forces in addition to other aerodynamic or mechanical sources. An electric machine with high torque density generally has higher potential for noise and vibration that may be viewed as unacceptable. Different methods have been employed to mitigate the noise and vibrations from the electric machine, however as demands for higher torque density increases, new strategies or configurations to mitigate noise and vibrations from the electric machine must be developed.

SUMMARY

Disclosed is a stator provided with a permanent magnet machine. The stator includes a stator core disposed about a central longitudinal axis. The stator core has an exterior surface, an interior surface disposed opposite the exterior surface, the exterior surface and the interior surface each extending between a first face and a second face along the central longitudinal axis, and a plurality of stator teeth radially extending from the interior surface towards the central longitudinal axis. The stator core defines an opening that extends from the first face towards the second face and is disposed adjacent to a first stator tooth of the plurality of stator teeth.

Also disclosed is a permanent magnet machine that includes a machine housing and a stator disposed within the machine housing. The machine housing has an inner surface that extends between a first housing end and a second housing end along a central longitudinal axis. The stator has a stator core having an exterior surface and an interior surface, each extending between a first face and a second face along the central longitudinal axis. The stator core defines a plurality of openings that extend from the first face towards the second face.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1A:
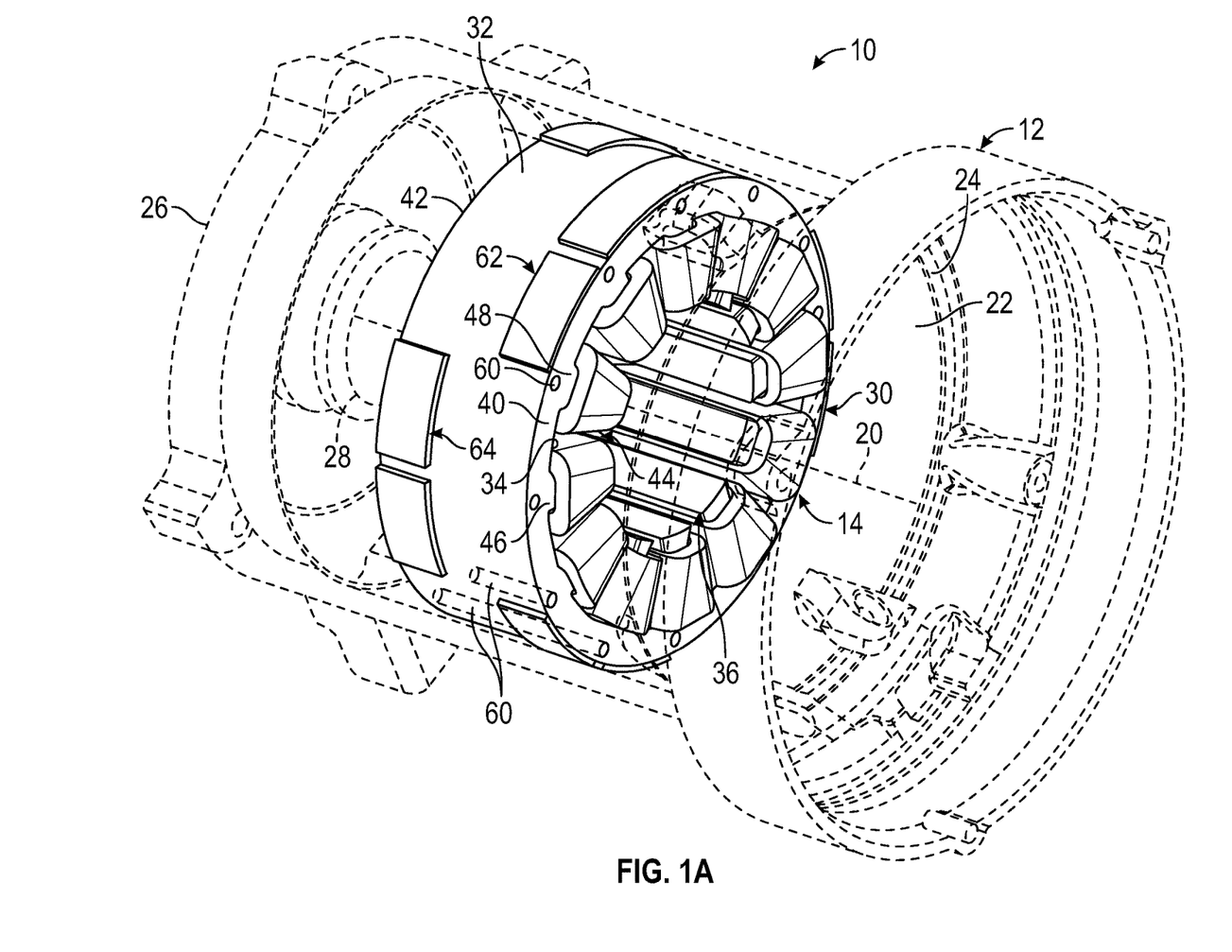
FIG. 1A is a partial perspective view of a stator disposed within an electric machine housing.
Figure 1B:
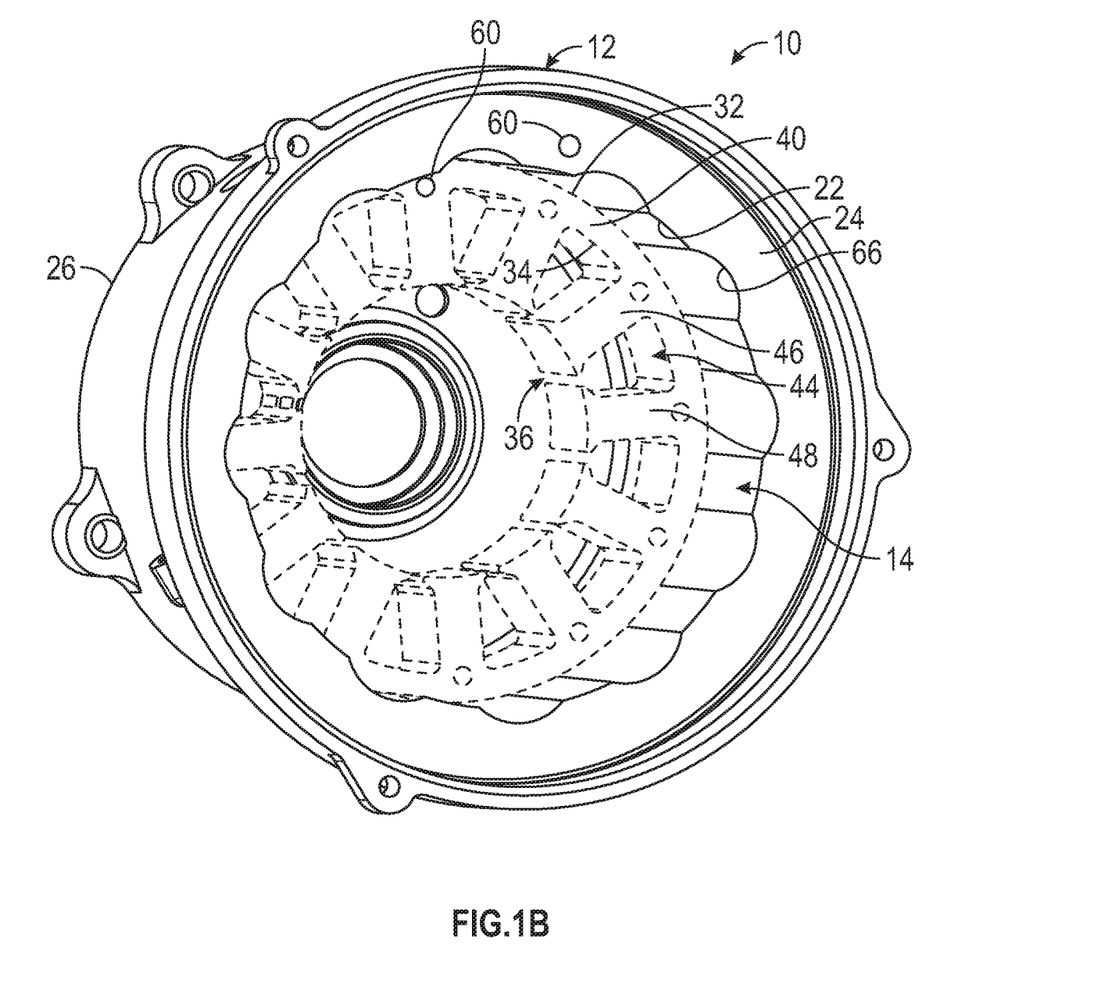
FIG. 1B is a partial perspective view of a stator disposed within an electric machine housing defining a discontinuous region.

Referring to FIGS. 1A and 1B, an electric machine, such as a permanent magnet machine 10 is shown. The permanent magnet machine 10 includes a machine housing 12 and a stator 14 that is arranged to be disposed within the machine housing 12.

The machine housing 12 is disposed about a central longitudinal axis 20. The machine housing 12 includes an inner surface 22 that extends between a first housing end 24 and a second housing end 26 along the central longitudinal axis 20. The first housing end 24 may be an open and the second housing end 26 may be a closed end. The second housing end 26 defines an opening 28 that is generally aligned along the central longitudinal axis 20 along which a shaft or the like may extend through.

The stator 14 is disposed within the machine housing 12 and is secured to the inner surface 22 of the machine housing 12. The stator 14 includes a stator core 30 that is disposed about the central longitudinal axis 20.

Referring to the Figures, the stator core 30 includes an exterior surface 32, an interior surface 34 that is disposed opposite the exterior surface 32, and a plurality of stator teeth 36. The exterior surface 32 and the interior surface 34 extending between a first face 40 and a second face 42 along the central longitudinal axis 20. The exterior surface 32 faces towards the inner surface 22 of the machine housing 12. The exterior surface 32 of the stator core 30 may be commonly referred to as the back iron of the stator 14. The plurality of stator teeth 36 radially extend from the interior surface 34 towards the central longitudinal axis. A slot 44 is defined between adjacent stator teeth of the plurality of stator teeth 36 such that the slot 44 is defined between a first stator tooth 46 and a second stator tooth 48 that is disposed adjacent to the first stator tooth 46 of the plurality of stator teeth 36. In such an arrangement, the slot 44 is circumferentially disposed between the first stator tooth 46 and the second stator tooth 48.

The stator 14 may employ various fractional slot topologies, e.g. various ratios between a number of slots and a number of poles associated with the stator 14. The fractional slot topologies impact a winding factor about a stator tooth of the plurality of stator teeth 36 and hence impact the torque density. The higher the winding factor among them, the higher the torque density. The higher torque density may result in low order vibration modes. The low mode order results from the interaction of the n-th order radial field due to the magnet poles and n-th+2 order radial field due to armature reaction. The low mode order leads to stator deformation that leads to electric machine vibrations that is perceived as noise.

The present disclosure attempts to address the machine vibrations that are perceived as noise by providing openings 60 in the machine housing 12 and/or the stator 14 that are arranged to damp radial forces transmitted through a stator tooth of the plurality of stator teeth 36.

Referring to FIG. 1A, a discontinuous region may be defined by a first raised region 62 and a second raised region 64 of the exterior surface 32 of the stator 14. The first raised region 62 is disposed proximate the first face 40. The second raised region 64 is circumferentially and axially spaced apart from the first raised region 62. The second raised region 64 is disposed proximate the second face 42. At least one of the first raised region 62 and the second raised region 64 is arranged to engage the inner surface 22 of the machine housing 12. The first raised region 62 and the second raised region 64 are arranged to reduce the number of points of contact between the exterior surface 32 of the stator 14 and the inner surface 22 of the machine housing 12.

Referring to FIG. 1B, a discontinuous region may be defined by the inner surface 22 of the machine housing 12. The discontinuous region may be defined by recessed regions 66 of the inner surface 22 of the machine housing 12. The recessed regions 64 may extend from the inner surface 22 towards an outer surface of the machine housing 12 along an axis that is disposed transverse to the central longitudinal axis 20.

The discontinuous region defined by the recessed regions 66 of the inner surface 22 of the machine housing 12 and/or by the first and second raised regions 62, 64 of the exterior surface 32 of the stator may reduce points of contact between the exterior surface 32 of the stator 14 and the inner surface 22 of the machine housing 12 to reduce force transmittal through a stator tooth of the plurality of stator teeth 36 to the machine housing 12 and therefore reduces radiated noise and vibration by reducing deformation of the stator 14 without compromising motor torque density. The implementation of the recessed regions 66 on the inner surface 22 of the machine housing 12 and maintaining a uniform or substantially uniform exterior surface 32 of the stator 14, the potential for magnetic loss of the permanent magnet machine 10 due to discontinuities on the exterior surface 32 of the stator 14 may be minimized.

The openings 60 of the stator core 30 and/or the machine housing 12 act as springs that damp the radial forces and reduce deformation of the stator core 30 or the machine housing 12 to reduce radiated noise and vibration. The openings 60 may each extend from a face of the machine housing 12 that is disposed at the first housing end 24 towards the second housing end 26 along the central longitudinal axis 20. The openings 60 may be disposed between the exterior surface 32 and the interior surface 34 of the stator core 30. The openings 60 may be disposed closer to the exterior surface 32 than the interior surface 34, to have no to minimal effect on the electromagnetic performance of the electric machine.

The openings 60 may each have a circumferential width that is substantially equal to a circumferential width of at least one of the first stator tooth 46 and the second stator tooth 48 of the plurality of stator teeth 36. The openings 60 may each have a circumferential width that is substantially equal to a circumferential width of the slot 44 that is defined between the first stator tooth 46 and the second stator tooth 48 of the plurality of stator teeth 36. In other embodiments, the openings 60 may have a circumferential width that is substantially less than a circumferential width of a tooth of the plurality of stator teeth 36 or a width of the slot 44.

The openings 60 may be arranged as indentations, depressions, grooves, or the like that extend from the first face 40 towards the second face 42 without extending completely through the stator core 30. The openings 60 may be arranged as slots that extend from the first face 40 to the second face 42 such that the openings 60 extend completely through the stator core 30. In at least one embodiment, the openings 60 may instead by nodules, protrusions, or the like having a mass that axially extend away from the first face 40 along the central longitudinal axis 20. The openings 60 may have varying depths that are measured from the first face 40 towards the second face 42 such that the a first opening may have a first depth and a second opening circumferentially spaced apart from the first opening may have a second depth that is greater than or less than the first depth. The openings 60 may be circumferentially distributed about the stator core 30 having varying angles of distribution or varying circumferential distances between adjacent openings such that a first angle (e.g. relative to the central longitudinal axis) or first circumferential distance between a first opening and a second opening disposed adjacent the first opening may be different from (e.g. greater than or less than) a second angle or second circumferential distance between the second opening and a third opening disposed adjacent the second opening. The varying depth of the openings 60 or varying angle or distance between adjacent openings may vary a damping response of the stator core 30.

Figure 2A:
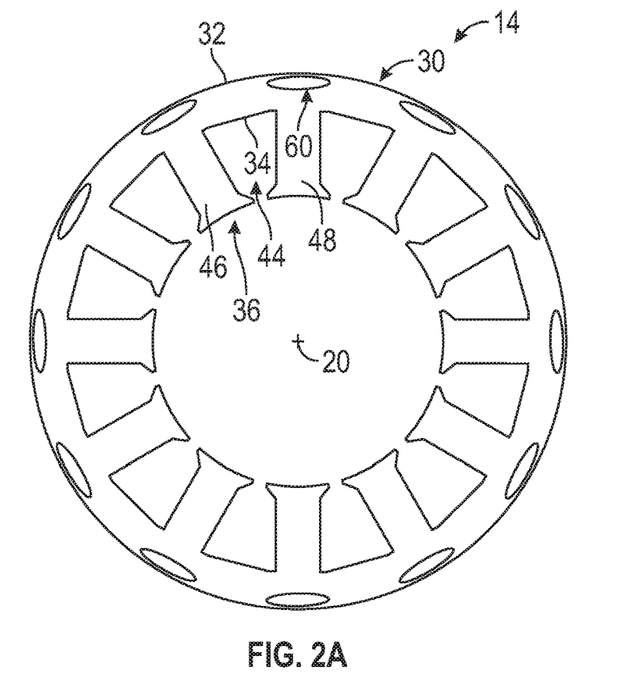
FIGS. 2A and 2B are views of a stator having openings.
Figure 2B:
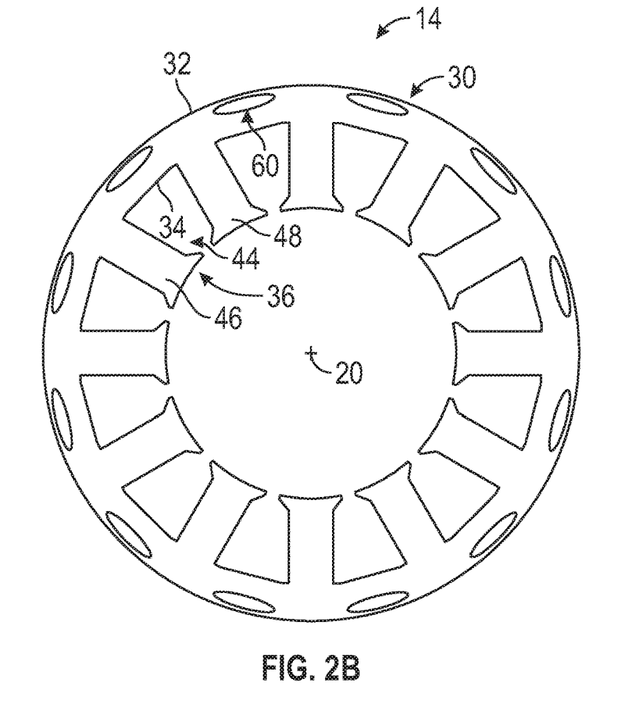

Referring to FIG. 2A, the openings 60 may be arranged as a generally elliptical slot that is circumferentially aligned with at least one of the first stator tooth 46 and the second stator tooth 48 of the plurality of stator teeth 36. Referring to FIG. 2B, the opening 60 may be arranged as a generally elliptical slot that is circumferentially aligned with the slot 44 that is disposed or defined between the first stator tooth 46 and the second stator tooth 48 of the plurality of stator teeth 36.

Figure 3A:
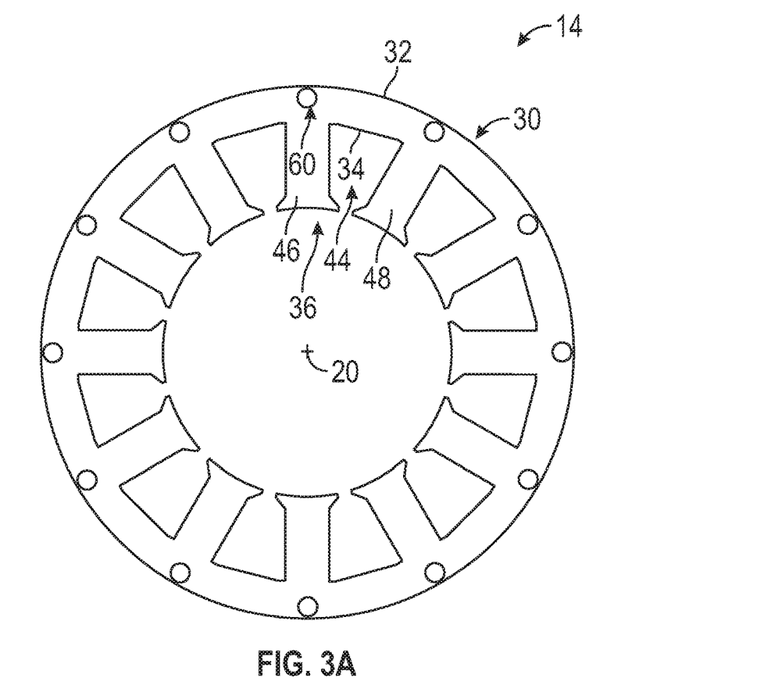
FIGS. 3A and 3B are views of a stator having openings.
Figure 3B:
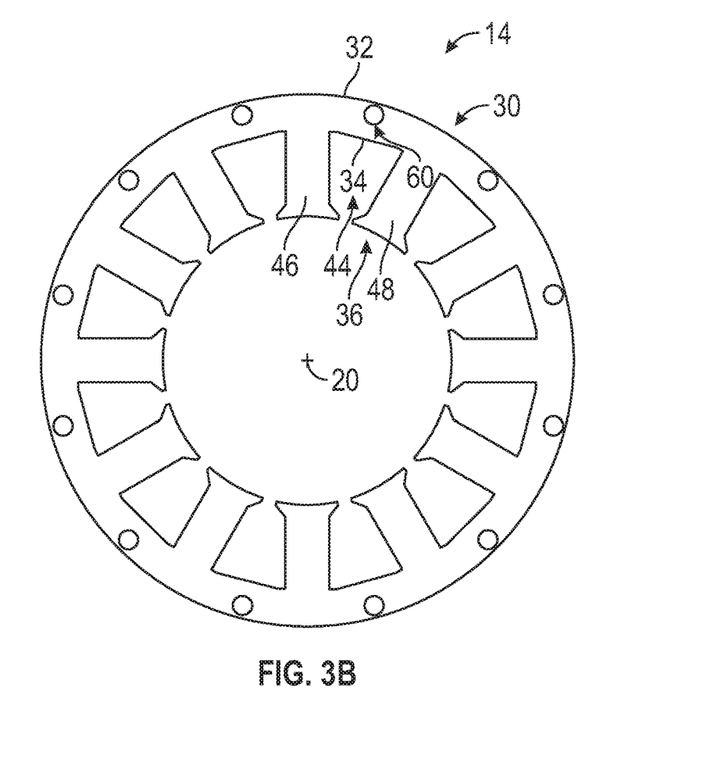

Referring to FIG. 3A, the openings 60 may be arranged as a generally circular opening that is circumferentially aligned with at least one of the first stator tooth 46 and the second stator tooth 48 of the plurality of stator teeth 36. Referring to FIG. 3B, the opening 60 may be arranged as a generally circular opening that is circumferentially aligned with the slot 44 that is disposed or defined between the first stator tooth 46 and the second stator tooth 48 of the plurality of stator teeth 36.

Figure 4A:
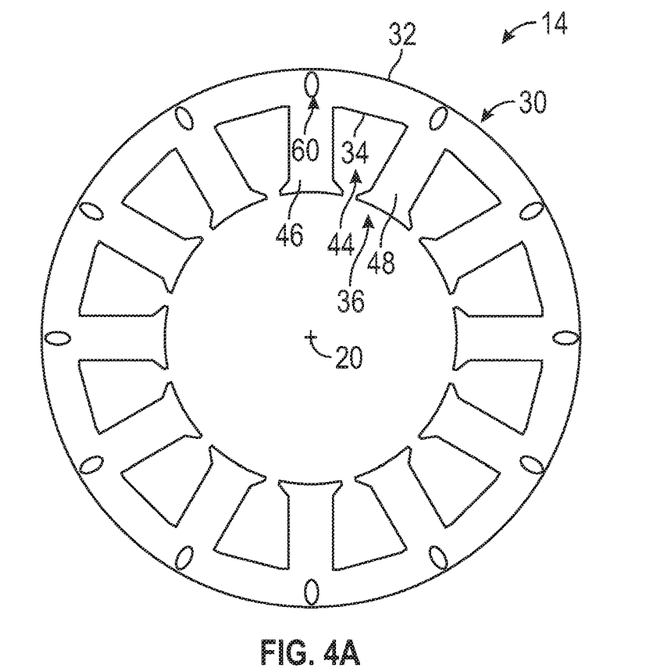
FIGS. 4A and 4B are views of a stator having openings.
Figure 4B:
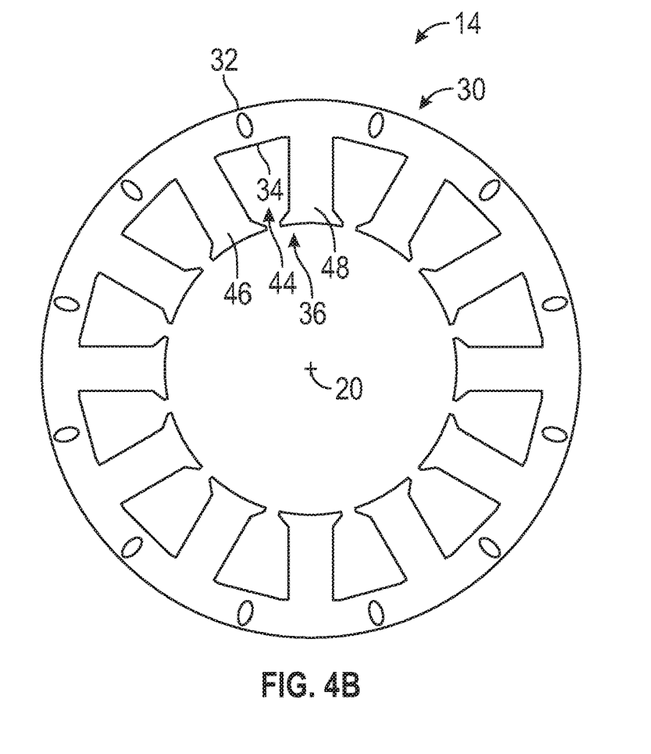

Referring to FIG. 4A, the openings 60 may be arranged as a bean-shaped or ovate shaped opening that is circumferentially aligned with at least one of the first stator tooth 46 and the second stator tooth 48 of the plurality of stator teeth 36. Referring to FIG. 4B, the opening 60 may be arranged as a bean-shaped or ovate shaped opening that is circumferentially aligned with the slot 44 that is disposed or defined between the first stator tooth 46 and the second stator tooth 48 of the plurality of stator teeth 36.

Figure 5A:
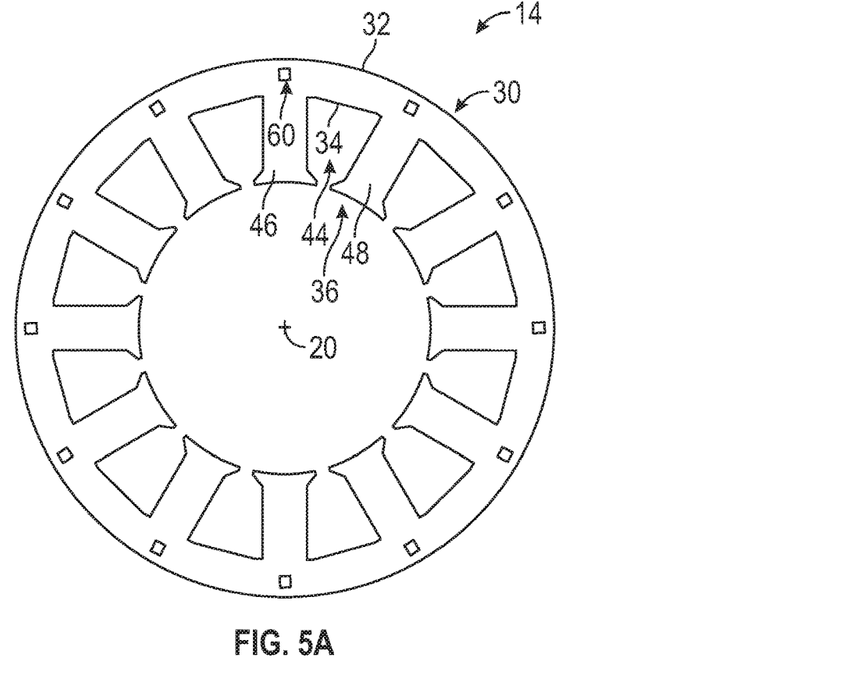
FIGS. 5A and 5B are views of a stator having openings.
Figure 5B:
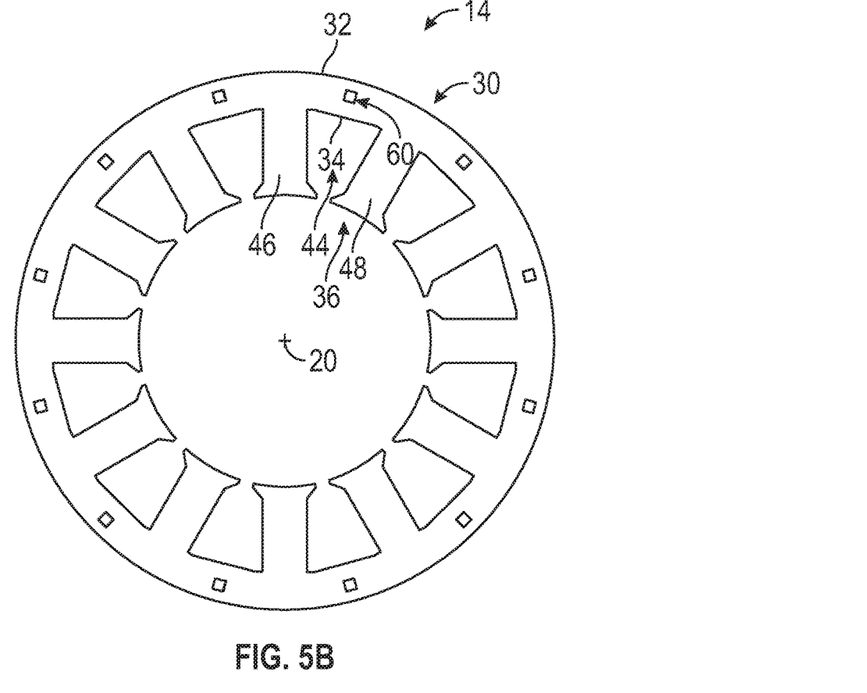

Referring to FIG. 5A, the openings 60 may be arranged as a rectangular shaped opening, with rounded corners, that is circumferentially aligned with at least one of the first stator tooth 46 and the second stator tooth 48 of the plurality of stator teeth 36. Referring to FIG. 5B, the opening 60 may be arranged as a rectangular shaped opening, with rounded corners, that is circumferentially aligned with the slot 44 that is disposed or defined between the first stator tooth 46 and the second stator tooth 48 of the plurality of stator teeth 36.

The openings 60 disposed proximate the outer periphery of the stator 14 does not affect torque or any other electromagnetic performance of the permanent magnet machine 10. The openings 60 may vary in number, size, shape, and location about the stator core 30 of the stator 14. Regardless of the number, shape, or location of the openings 60, the openings 60 reduce force transmittal through a stator tooth of the plurality of stator teeth 36 to the machine housing 12 to reduce radiated noise and vibration by reducing deformation of the stator 14 without compromising motor torque density.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A permanent magnet machine, comprising:
a machine housing having an inner surface that extends between a first housing end and a second housing end along a central longitudinal axis; and
a stator disposed within the machine housing, the stator having a stator core having an exterior surface and an interior surface, each extending between a first face and a second face along the central longitudinal axis, the stator core defining a plurality of openings that extend from the first face towards the second face,
wherein the stator core includes a plurality of stator teeth that radially extend from the interior surface towards the central longitudinal axis,
wherein the opening is circumferentially disposed between a first stator tooth and a second stator tooth of the plurality of stator teeth,
wherein a first opening of the plurality of openings has a first depth and a second opening of the plurality of openings has a second depth that is at least one of greater than or less than the first depth, wherein the first depth and the second depth are in an axial direction that is parallel to the central longitudinal axis.

2. The permanent magnet machine of claim 1, wherein the exterior surface defines a first raised region that is disposed proximate the first face.

3. The permanent magnet machine of claim 2, wherein the first raised region is arranged to engage the inner surface.

4. The permanent magnet machine of claim 2, wherein the exterior surface defines a second raised region that is disposed proximate the second face.

5. The permanent magnet machine of claim 4, wherein the second raised region is arranged to engage the inner surface.

6. The permanent magnet machine of claim 1, wherein the inner surface defines recessed regions that extend from the inner surface towards an outer surface of the machine housing.

7. The permanent magnet machine of claim 1, wherein the plurality of openings are circumferentially distributed about the stator core having varying angles of distribution between adjacent openings.

* * * * *